June 7, 1955

J. C. FROMMER 2,709,943

DEVICES FOR DETERMINING THE TRANSMISSION
OF RADIATIONS THROUGH BODIES

Filed Aug. 7, 1951

INVENTOR

Joseph C. Frommer

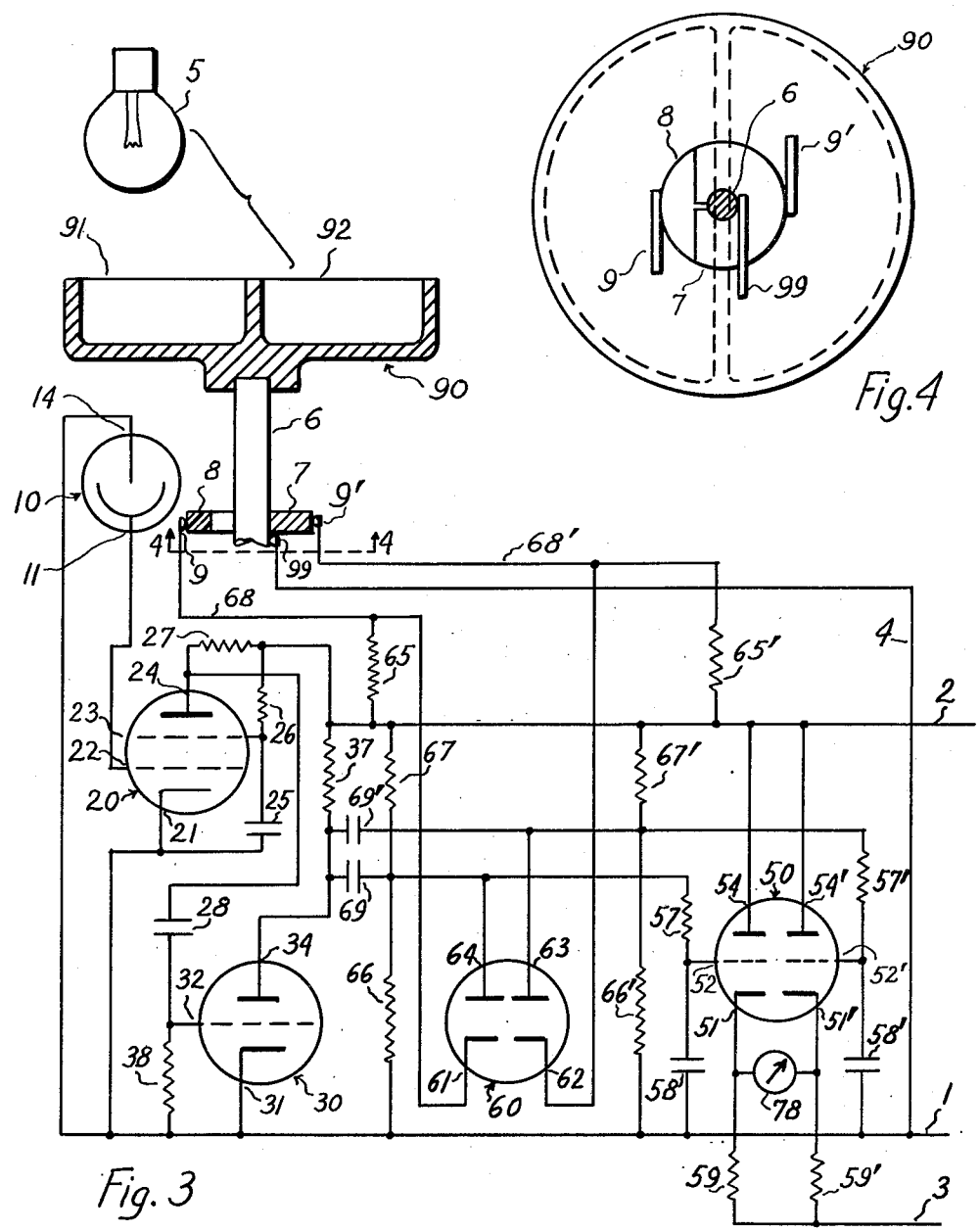

{ # United States Patent Office 2,709,943
Patented June 7, 1955

2,709,943

DEVICES FOR DETERMINING THE TRANSMISSION OF RADIATIONS THROUGH BODIES

Joseph C. Frommer, Cincinnati, Ohio, assignor to Electric Eye Equipment Company, Danville, Ill., a corporation of Delaware Application August 7, 1951, Serial No. 240,631

2 Claims. (Cl. 88—14)

This invention relates to the determination of the transmission of radiations through objects, samples of materials, or the like, all of which shall be referred to as "bodies," irrespective of whether they are stationary or in movement as e. g. a liquid flowing through an inspection chamber. To distinguish the bodies to be tested from bodies of known transmissive properties used as a reference, the former ones will be called "object bodies" and the latter ones "reference bodies." The radiations may be visible, infrared, ultraviolet or other. The determination may be used for indicating or recording the transmission, to actuate a relay if absorption transgresses certain preset limits, or for some other purpose. Devices for measuring transmission comprise a source of radiations, an electrical circuit element sensitive to these radiations (to be called "sensor"), and some means to keep the object body in the path of the radiations from said source to said sensor. The readings of such devices are influenced by variations in the emission of the source, by variations in the sensitivity of the sensor, and by other similar effects. In the laboratory it is possible to recalibrate the instrument from time to time by removing the object body and checking the response of the sensor if only the atmosphere or a reference body is kept in the path of radiations from the source to the sensor. There has not been known a device of similar accuracy for the use without human supervision and recalibration.

According to the present invention the object body is periodically brought into the path from the source to the sensor, and the sensor is connected to a circuit sensitive to the ratio between the radiation reaching the sensor during periods in which the object body is interposed ("testing periods") and periods during which the object body is removed ("reference periods"). This ratio will not be influenced by variations of the emission of the source or of the sensitivity of the sensor, because such variations would appear in the denominator of said ratio as well as in its numerator.

In order to get as much information as possible on continuously changing samples, the cycles comprising the testing periods and the reference periods should be as short as compatible with moving the necessary masses, that is below around 1 per second for small size bodies and below around 1 per 5 seconds for large size bodies.

If the object body is a fluid, then it is usually contained by walls, and it is advisable to make the walls intercepting the path from the source to the sensor of material having as low absorption for the radiation being used as possible. A certain amount of radiations still may be absorbed in these walls. This absorption will cause the radiation reaching the sensor to be lower by a certain percentage than it would be if only the sample to be inspected were in the said path. According to the present invention walls of the same absorption properties are kept between source and sensor during the reference periods as are present between source and sensor during the test periods. In this way the radiations reaching the sensor during the reference periods are reduced by the same percentage as are the radiations reaching the sensor during the testing periods and the effect of the walls will not enter into the indication.

The radiations reaching the sensor will usually be higher during the reference periods than during the testing periods, and in a simple embodiment of the invention the circuit is made sensitive to the ratio between the lower level of radiations and the higher level of radiations reaching the sensor, without indicating which of these levels corresponds to the testing periods and which to the reference periods.

In certain cases it is desirable to compare the transmission of the object body with the transmission of a reference body of known transmissive properties. For such cases, according to the invention, a reference body is being interposed between the source and the sensor during at least a portion of the time in which the object body is not interposed. In such arrangements the radiation reaching the sensor during the test periods may be higher or lower than the radiation reaching it during the reference periods. According to the present invention monitoring means are provided to monitor the testing periods, the reference periods, or both.

It is an object of the invention to provide a new and improved device for determining transmissive properties of bodies.

A further object of the invention is to provide a device for determining transmissive properties, unaffected by variations of the source of radiations and of the sensor.

A further object of the invention is to determine the ratio between the transmission of an object body and of a reference body.

A further object of the invention is to eliminate the effect on the indications of the container confining fluid samples.

Further objects and advantages of the invention may become apparent in connection with the description of the drawings of which:

Fig. 3 represents another embodiment of the invention comprising monitoring means, and Fig. 4 represents a section taken across the line 4—4 in Fig. 3.

Figure 2:
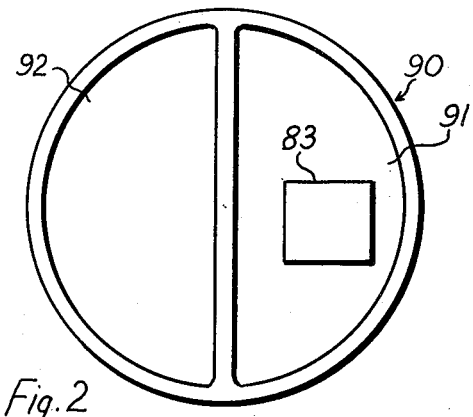
Fig. 2 represents a top view of this device.
Figure 1:
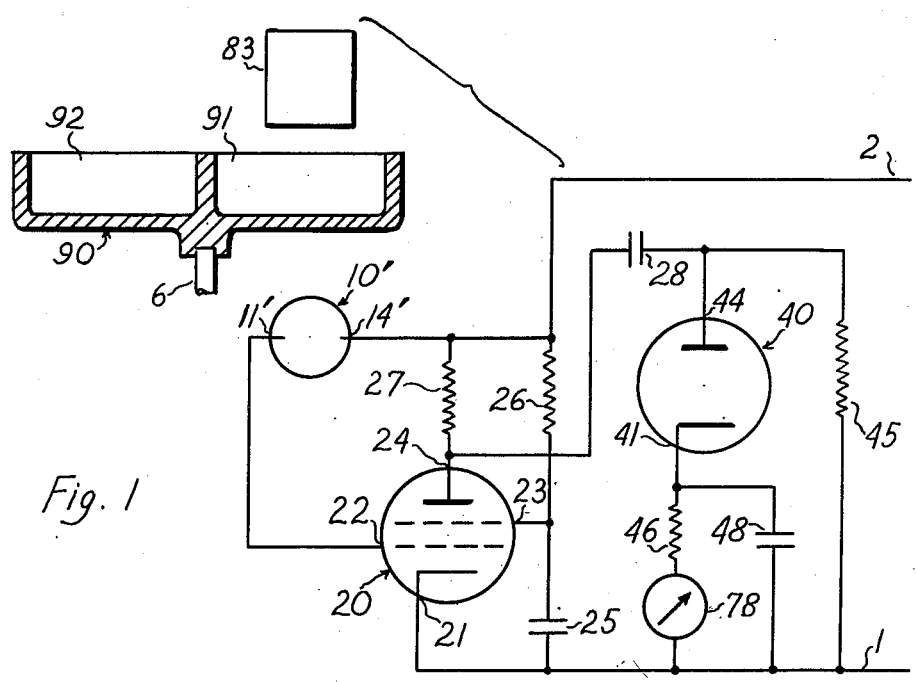
Fig. 1 represents the cross sectional view and circuit diagram of a simple device according to the invention.

Figs. 1 and 2 represent a very simple arrangement for the measurement of transmission of gamma rays through a certain thickness of a liquid. In these figures (as well as in the other figures) 90 represents a rotatable platform comprising two compartments 91, 92, and mounted on a shaft 6; 83 is a generator of gamma radiations and 10' is an ionization gage having a cathode 11' and an anode 14'. 20 is a vacuum tube having a cathode 21, a grid 22, a screen grid 23 and an anode 24. Tube 20 will be referred to as a pentode as it usually has a suppressor grid connected to the cathode (not shown). 40 is a diode having a cathode 41 and an anode 44; 26, 27, 45 and 46 are resistors and 25, 28 and 48 are capacitors. 78 is an indicating or recording meter. The arrangement further comprises a supply of plate current, not shown, which supplies a preferably regulated voltage of say 300 volts between the positive terminal 2 and the negative terminal 1. Anode 14' of ionization gauge 10' is connected to the positive terminal 2 of the plate supply, and cathode 11' of the ionization gauge 10' is connected to grid 22 of tube 20. The cathode 21 of tube 20 is connected to the negative terminal 1. Screen 23 is connected to the positive terminal 2 through resistor 26 and to the negative terminal 1 through capacitor 25. Anode 24 is further connected to diode-anode 44 through capacitor 28, and diode-anode 44 is also connected to line 1 through resistor 45. Cathode 41 of diode 40 is connected to line 1 through the parallel connection formed of capacitor 48 and of the series connection of resistor 46 with meter 78.

A sample of the material to be tested is poured into compartment 91. 92 is kept empty, or it is filled with a material of known transmissive properties, used as a reference. The platform 90 is rotated around the axis of shaft 6 so that compartments 91 and 92 are alternately interposed between source 83 and gauge 10′. Accordingly the current in ionization gauge 10′ will assume a level corresponding to the transmission of the object body during one part of each revolution of shaft 6 and to the transmission corresponding to the content of compartment 92 during another part of each revolution of shaft 6. Both these currents will be affected to an equal percentage by variations of the radiations emanating from source 83, by variations of the sensitivity of gauge 10′, and by the additional absorption due to the platform 90. Therefore, even though both of these currents are subject to drift, their ratio will stay rigorously constant and will give true indication of the transmission of the sample. This ratio is obtained by sending the current of gauge 10′ through the grid to cathode path of vacuum tube 20. The alternating voltage obtained on plate 24 of this tube will be dependent on the ratio between the upper level of current and lower level of current flowing in said grid to cathode path, as was disclosed in my Patent No. 2,517,554. This alternating voltage is being rectified in diode 40. The direct current obtained in diode 40 flows through meter 78 and causes in it a deflection corresponding to said ratio, which is a measure of the transmission of the sample in the container 91.

The just described arrangement, while giving indication of the ratio between the transmission of the content of compartments 91 and 92, gives no information on which of the two transmission values is greater. This may cause no trouble if the reference compartment is kept empty because the absorption of air is lower than absorption of liquids. However if the object body is being compared with such a reference body that the transmission through the former may be above or below the transmission through the latter, then it will be usually desired to know which of the two is higher. This can be achieved by providing monitoring signals. An example for such monitoring signals is given in Figs. 3 and 4. In addition to the parts shown in the two earlier figures and bearing the same reference numerals, these drawings show an insulating disc 7 with a conducting segment 8 embedded into it and fastened to shaft 6; brushes 9, 9′ and 99; a lamp 5; and a phototube 10 having a cathode 11 and an anode 14. The electronic amplifier comprises in addition to the tube 20 a triode 30 having a cathode 31, a grid 32 and an anode 34; a twin diode 60 having cathodes 61, 62 and anodes 64, 63; a twin triode 50 having cathodes 51, 51′, grids 52, 52′ and anodes 54, 54′; and a meter 78. A B-supply provides positive voltage on line 2 and negative voltage on line 3 with respect to the zero line 1.

The conducting sector 8 is connected to the zero line 1 via lead 4, brush 99 and shaft 6. Brushes 9, 9′ are connected to diode cathodes 61, 61′ via leads 68, 68′. Cathodes 61, 62 are further connected to line 2 via resistors 65, 65′. Phototube 10 is connected across the grid to cathode path of tube 20. Tube 30 is condenser coupled to the output of tube 20. The platform 90 is rotated around the axis of its shaft 6, so that during one portion of each revolution the compartment 91 is interposed between lamp 5 and phototube 10, and during another portion of each revolution the compartment 92 is interposed between them. Accordingly the phototube 10 will furnish a current corresponding to the transmission of the content of one compartment for one part of each revolution and a photocurrent corresponding to the content of the other compartment during another portion of each revolution. These currents are caused to flow through the grid to cathode path of tube 20 and will cause an alternating voltage on anode 24 dependent, as stated before, on the ratio of these two currents. This alternating voltage is amplified in tube 30 and brought to the diode plates 64, 63 through capacitors 69, 69′. Resistors 65, 65′ tend to keep the potential of the diode cathodes 61, 62 at the positive potential of line 2, but brush 9 grounds cathode 61 during the period in which compartment 91 is between lamp 5 and phototube 10, and brush 9′ grounds cathode 62 during the periods in which container 92 is between lamp and phototube. Each diode will be active only during the period in which its cathode is more negative than its anode and therefore diode-anode 64 will assume an average voltage governed by the transmission of the content of compartment 91, and diode-anode 63 will assume an average voltage governed by the transmission of the content of compartment 92. The average diode-anode voltages are brought to the grids 52, 52′ of twin triode 50 so that the voltage difference between these two grids will depend in magnitude on the ratio between the two transmission values and in polarity on whether the transmission of the content of one compartment is higher or lower than the transmission of the content of the other compartment. Twin triode 50 is connected as a cathode follower and will send a current through meter 78 depending in magnitude and in polarity on the voltage between grids 52, 52′. A more detailed description of a very similar circuit is given in connection with Figs. 5, 6, 7 and 8 of the above mentioned Patent No. 2,517,554.

Whilst the drawings show meters only, it is clear that recorders or relays may be connected as well to the amplifiers. Many other changes in design may be made without departing from the spirit of the invention.

I claim:

1. A device for determining the transmission of radiations through a body comprising a source of radiations, sensing means responsive to the radiations of said source, a path of radiations between said source and said sensing means, means for periodically interposing said body into said path, a first monitoring means responsive when said body is interposed in said path, a second monitoring means responsive when said body is not interposed in said path, an electrical circuit connected with said sensing means responsive to signals received by said sensing means and to impulse received from said monitoring means, said circuit including means for determining the ratio between the signals received by said sensing means at different times, said ratio determining means connected in said circuit with said monitoring means such that the ratio is measured between the signals received during the response time of said first monitoring means and the response time of said second monitoring means.

2. The device of claim 1 further characterized by having said means for periodically interposing said body in said path of radiations comprising structural elements intercepting said path, and said structural elements reducing the radiations received by the sensing element the same amount during the response time of said first monitoring element as during the response time of the second monitoring element.

References Cited in the file of this patent

UNITED STATES PATENTS

| | | |
|---|---|---|
| 2,451,572 | Moore | Oct. 19, 1948 |
| 2,469,206 | Rich | May 3, 1949 |
| 2,502,319 | Golay | Mar. 28, 1950 |
| 2,547,212 | Jamison et al. | Apr. 3, 1951 |
| 2,577,735 | Broomell, Jr. | Dec. 11, 1951 |
| 2,583,132 | Altar et al. | Jan. 22, 1952 |